(12) United States Patent
Wang et al.

(10) Patent No.: US 10,302,254 B2
(45) Date of Patent: May 28, 2019

(54) ADSORBED NATURAL GAS STORAGE FACILITY

(71) Applicant: Saudi Arabian Oil Company, Dhahran (SA)

(72) Inventors: Yuguo Wang, Dhahran (SA); Cemal Ercan, Dhahran (SA); Mohammed Ghalib Al-Hashim, Dhahran (SA); Anwar H. Al-Khawajah, Dammam (SA); Rashid M. Othman, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 365 days.

(21) Appl. No.: 15/226,481

(22) Filed: Aug. 2, 2016

(65) Prior Publication Data

US 2016/0346724 A1 Dec. 1, 2016

Related U.S. Application Data

(62) Division of application No. 13/800,489, filed on Mar. 13, 2013, now Pat. No. 9,562,649.

(Continued)

(51) Int. Cl.
*F17C 11/00* (2006.01)
*B01D 53/02* (2006.01)
(Continued)

(52) U.S. Cl.
CPC ............ *F17C 11/007* (2013.01); *B01D 53/02* (2013.01); *B01D 53/04* (2013.01);
(Continued)

(58) Field of Classification Search
CPC .......... B01D 2253/10; B01D 2256/245; B01D 2257/702; B01D 2257/7025;
(Continued)

(56) References Cited

U.S. PATENT DOCUMENTS 3,445,990 A * 5/1969 Hays ...................... B01D 53/04
                                                          95/105
4,495,900 A    1/1985 Stockmeyer
                        (Continued)

FOREIGN PATENT DOCUMENTS

CA       2638663 A1    1/2009
JP       9323016 A    12/1997
                  (Continued)

OTHER PUBLICATIONS

Wang et al., "Experimental and Theoretical Study of Methane Adsorption on Granular Activated Carbons", AIChE Journal, Mar. 2012, pp. 782-788, vol. 58, No. 3.

(Continued)

*Primary Examiner* — Keith M Raymond
(74) *Attorney, Agent, or Firm* — Bracewell LLP; Constance G. Rhebergen; Kevin R. Tamm

(57) ABSTRACT

A natural gas storage facility for reducing effects of diurnal demand on a natural gas source is disclosed. The natural gas storage facility includes a guard bed system that has a heavy natural gas component storage capacity and that is operable to remove impurities from introduced natural gas, to selectively separate the introduced natural gas into a heavy natural gas component and a light natural gas component, to retain the heavy natural gas component and to release the heavy natural gas component and an adsorption bed system that fluidly couples to the guard bed system, that has a light natural gas component storage capacity, that contains a light natural gas adsorbent that is a microporous material, and that is operable to retain the light natural gas component using the light natural gas adsorbent and to release the light natural gas component from the light natural gas adsorbent.

23 Claims, 3 Drawing Sheets

US 10,302,254 B2
Page 2

Related U.S. Application Data

(60) Provisional application No. 61/638,040, filed on Apr. 25, 2012.

(51) Int. Cl.
    *B01D 53/04* (2006.01)
    *B01D 53/54* (2006.01)
    *F25J 3/08* (2006.01)
    *C10L 3/10* (2006.01)

(52) U.S. Cl.
    CPC ..... *B01D 53/0438* (2013.01); *B01D 53/0446* (2013.01); *B01D 53/0454* (2013.01); *B01D 53/0462* (2013.01); *B01D 53/54* (2013.01); *C10L 3/10* (2013.01); *F25J 3/08* (2013.01); *B01D 2253/102* (2013.01); *B01D 2256/245* (2013.01); *B01D 2257/7022* (2013.01); *B01D 2259/40088* (2013.01); *B01D 2259/4525* (2013.01); *C10L 2290/30* (2013.01); *C10L 2290/542* (2013.01); *Y02C 20/20* (2013.01)

(58) Field of Classification Search
    CPC .......... B01D 2259/40088–2259/40098; B01D 2259/4525; B01D 53/02; B01D 53/04; B01D 53/0438; B01D 53/0446; B01D 53/0454; F17C 11/007; F25J 3/08
    See application file for complete search history.

(56) References Cited

U.S. PATENT DOCUMENTS

| | | | |
|---|---|---|---|
| 4,523,548 A | 6/1985 | Engel et al. | |
| 4,805,674 A | 2/1989 | Knowlton | |
| 4,817,684 A | 4/1989 | Turko et al. | |
| 4,933,314 A * | 6/1990 | Marumo | B01J 20/20 423/445 R |
| 5,207,530 A | 5/1993 | Brooks et al. | |
| 5,302,090 A | 4/1994 | Schoo | |
| 5,372,619 A | 12/1994 | Greinke et al. | |
| 5,385,876 A * | 1/1995 | Schwarz | B01J 20/20 206/0.7 |
| 5,639,707 A | 6/1997 | Lewis et al. | |
| 5,972,826 A | 10/1999 | Boes et al. | |
| 5,998,647 A | 12/1999 | Seki et al. | |
| 6,205,793 B1 | 3/2001 | Schimp | |
| 6,298,671 B1 | 10/2001 | Kennelley et al. | |
| 6,613,126 B2 | 9/2003 | Tange et al. | |
| 6,692,554 B1 | 2/2004 | Leffel et al. | |
| 6,813,893 B2 | 11/2004 | Bishop et al. | |
| 6,930,193 B2 | 8/2005 | Yaghi et al. | |
| 2002/0023539 A1 * | 2/2002 | Tange | C10L 3/06 95/143 |
| 2002/0124567 A1 | 9/2002 | Carver et al. | |
| 2011/0185896 A1 * | 8/2011 | Sethna | B01D 53/002 95/45 |

FOREIGN PATENT DOCUMENTS

| | | |
|---|---|---|
| JP | 2005273717 A | 10/2005 |
| JP | 4812194 B2 | 11/2011 |

OTHER PUBLICATIONS

PCT Int'l Search Report and the Written Opinion dated Aug. 6, 2013; Int'l Application No. PCT/US2013/038113; Int'l Filing Date: Apr. 25, 2013.

\* cited by examiner

ADSORBED NATURAL GAS STORAGE FACILITY

CROSS-REFERENCE TO RELATED PATENT APPLICATIONS

This application is a divisional application of and claims priority to and the benefit of U.S. Non-Provisional patent application Ser. No. 13/800,489, filed on Mar. 13, 2013, which claims priority to and the benefit of U.S. Provisional Application No. 61/638,040, filed Apr. 25, 2012. For purposes of United States patent practice, this application incorporates the contents of the Provisional application by reference in its entirety.

BACKGROUND OF THE INVENTION

1. Field of the Invention

The field of invention relates to the storage of natural gas. More specifically, the field relates to a system and a method for storing and releasing natural gas during different periods of demand.

2. Description of the Related Art

Natural gas is the portable and preferred fuel of choice around the world. Natural gas burns more completely than other traditional fuels, including petroleum and coal; therefore, the combustion of natural gas is comparatively less harmful to the environment. Natural gas and similar products, including LNG, propane and other compressed-gas fuels are much more efficient in engine and turbine combustion systems.

Electricity generation with gas turbines is well understood and relatively inexpensive. Recirculation of hot, compressed exhaust gases can lead to thermal conversion efficiencies of well over 90%. Turbine co-generation facilities not only produce electricity and carbon dioxide, which is useful for enhanced oil recovery and other chemical processes, but also hot water and steam. Commercial and private consumers can both use these products.

With the broad availability of natural gas as a fuel, electricity generation using gas turbine technology is increasing. The locations of natural gas resources are not restricted to only a few geographical areas. Advances in fracturing deep shale reserves in Europe, Japan and the Americas show that natural gas is and will continue to be a primary fuel for industrialized societies for years to come. Electrical co-generation is the best way to provide the maximum benefits of the hydrocarbon fuel for consumer markets When producing electricity or natural gas for non-commercial users, a significant problem arises for natural gas transportation networks: diurnal demand. People, unlike manufacturing plants or facilities, tend not to be steady energy users throughout the day. People consume greater amounts of electricity during the day and into the early evening and much less at night and into the early morning. The higher rates of consumption form a "peak period of demand" and the lower rate of consumption creates a "non-peak period of demand". This daily trend occurs throughout the year. During different seasons, however, the length of each period (longer or shorter periods of natural light requiring lesser or greater amounts of artificial light, respectively) and the amplitude of the period (for example, greater amounts demanded at higher and lower temperatures versus more moderate temperatures) can change the amplitude of the demand during the diurnal period. The location of the demand also has an impact upon what the diurnal demand is like. In cooler environments, overall daily electrical and natural gas demand is lower in the summer months and higher in winter months as consumers use heating equipment. In warmer environments, the daily demand trends are opposite as consumer use air conditioning units to stay cool.

Swinging electrical and natural gas consumption—not only in daily use but also in seasonal differences—results in variability across the natural gas transportation and production system. Natural gas production is nearly constant. The supply-demand gap between natural gas production and total consumption results in a "gas demand lag". The lag, without intervention, manifests itself as system pressure increases and decreases ("swings") across the natural gas transportation system.

Electrical generation facilities prefer constant, high-pressure natural gas as a feedstock. Pressure swings in natural gas feed can damage the electrical generation equipment, especially rotational equipment, including gas turbines, due to sudden inappropriate feed-to-fuel ratios that cause equipment slowdowns while under load.

Past solutions to mitigate pressure swings include in-line compressors in the transportation systems. CNG (compressed natural gas) booster compressors that operate during peak demand periods attempt to maintain transportation system pressure. The loss of natural gas feed pressure can result in both downtime for electrical generators and dissatisfied public customers.

Using compression equipment increases operating expenses of the transmission system because the compression equipment operates at CNG transportation system pressure. The compression equipment also must be operable to tolerate the shift in daily operating temperatures. In-line compressors are expensive to maintain because they do not steadily operate: they start when system pressure is at a low threshold value and stop when system pressure is at a high threshold value.

Compressors, despite best maintenance practices, do inadvertently break down. Rotational equipment breakdowns sometimes are catastrophic, requiring weeks of downtime while delivering and tuning new units. The sudden loss of natural gas feed pressure from a malfunction can result in immediate downtime for downstream electrical generators and long-term dissatisfied public consumers.

SUMMARY OF THE INVENTION

A natural gas storage facility for reducing the effect of diurnal demand on a natural gas source includes a guard bed system and an adsorption bed system. The guard bed system has a heavy natural gas component storage capacity and is operable to remove impurities from an introduced natural gas, to selectively separate introduced natural gas into a heavy natural gas component and a light natural gas component, to retain the heavy natural gas component and to release the heavy natural gas component. The adsorption bed system fluidly couples to the guard bed system. The adsorption bed system has a light natural gas component storage capacity, contains a light natural gas adsorbent that is a microporous material, and is operable to both retain the light natural gas component using the light natural gas adsorbent and to release the light natural gas component from the light natural gas adsorbent. The natural gas storage facility couples to the natural gas storage facility such that introduced natural gas enters the guard bed system. Optionally, the natural gas storage facility includes a temperature control system and a compressor system.

A method of using a natural gas storage facility to reduce the effect of diurnal demand on a natural gas source includes the step of introducing a natural gas into the natural gas storage facility during a non-peak period of demand. The introduced natural gas has a natural gas thermal value.

The method also includes the step of operating the natural gas storage facility during the non-peak period of demand such that the guard bed system removes the natural gas impurities from the introduced natural gas. The method also includes the step of operating the natural gas storage facility during the non-peak period of demand such that the guard bed system both selectively separates the introduced natural gas into a heavy natural gas component and a light natural gas component and retains the heavy natural gas component. The method also includes the step of operating the natural gas storage facility during the non-peak period of demand such that the light natural gas component passes from the guard bed system to the adsorption bed system. The method also includes the step of operating the natural gas storage facility during the non-peak period of demand such that the adsorption bed system adsorbs the light natural gas component into a light natural gas adsorbent.

The method also includes the steps of operating the natural gas storage facility during a period of peak demand such that the guard bed system releases the heavy natural gas component, the adsorption bed system releases the light natural gas component from the light natural gas adsorbent, and the released heavy natural gas component and the released light natural gas component mix to form a released natural gas product. The method also includes the step of introducing the released natural gas product into the natural gas source during the peak period of demand.

The natural gas storage facility is operable to receive natural gas introduced from the natural gas source, to selectively separate the introduced natural gas into the heavy natural gas component and the light natural gas component and to separately retain the natural gas components during the non-peak period of demand. The natural gas storage facility is operable to the heavy and light natural gas components until the peak period of demand. The natural gas storage facility is operable to release the natural gas components and to introduce the natural gas components into the natural gas source during the period of peak demand.

The natural gas storage facility alleviates several problems and provides many advantages. The natural gas storage facility provides a means to "time shift" volumes of the natural gas produced during the non-peak period of demand and to release it during the period of peak demand. Adding the natural gas components to the natural gas source when natural gas is in greater demand and removing it when natural gas is not in demand reduces the amplitude of pressure swings caused by the difference in diurnal demand and steady supply, counter-acting the "swing" seen in natural gas source pressure. Receiving natural gas during the period of reduced consumer demand lowers the pressure of the natural gas source, and returning the natural gas in the form of the natural gas components during the period of greater consumer demand raises the pressure of the natural gas source.

Dampening the pressure swings in the natural gas source helps associated compression systems in operating more consistently and avoids cyclical pressure conditions. Reducing system pressure variations allows consumers to operate with a more consistent inlet system pressure. This lengthens the operational life span of rotational equipment and avoids many instances of acute stress-related failures.

The natural gas storage facility has a minimum amount of rotational equipment. Not requiring in-line rotational equipment reduces the lifetime costs of operating the natural gas transmission system as well as makes the facility operationally more reliable.

The natural gas storage facility primarily relies on pressure difference and overall change in the pressure of the natural gas source to introduce natural gas into the facility, to promote collection during the non-peak period of demand, and to facilitate discharge and introduction of the natural gas components to the natural gas source during the peak period of demand. Change to the guard bed system and the adsorption bed system temperature, either through variation in the ambient conditions or by using the temperature control system, encourages retention during the non-peak period of demand and release during the peak period of demand.

BRIEF DESCRIPTION OF THE DRAWINGS

These and other features, aspects, and advantages of the present invention are better understood with regard to the following Detailed Description of the Preferred Embodiments, appended Claims, and accompanying Figures, where:

Figure 1:
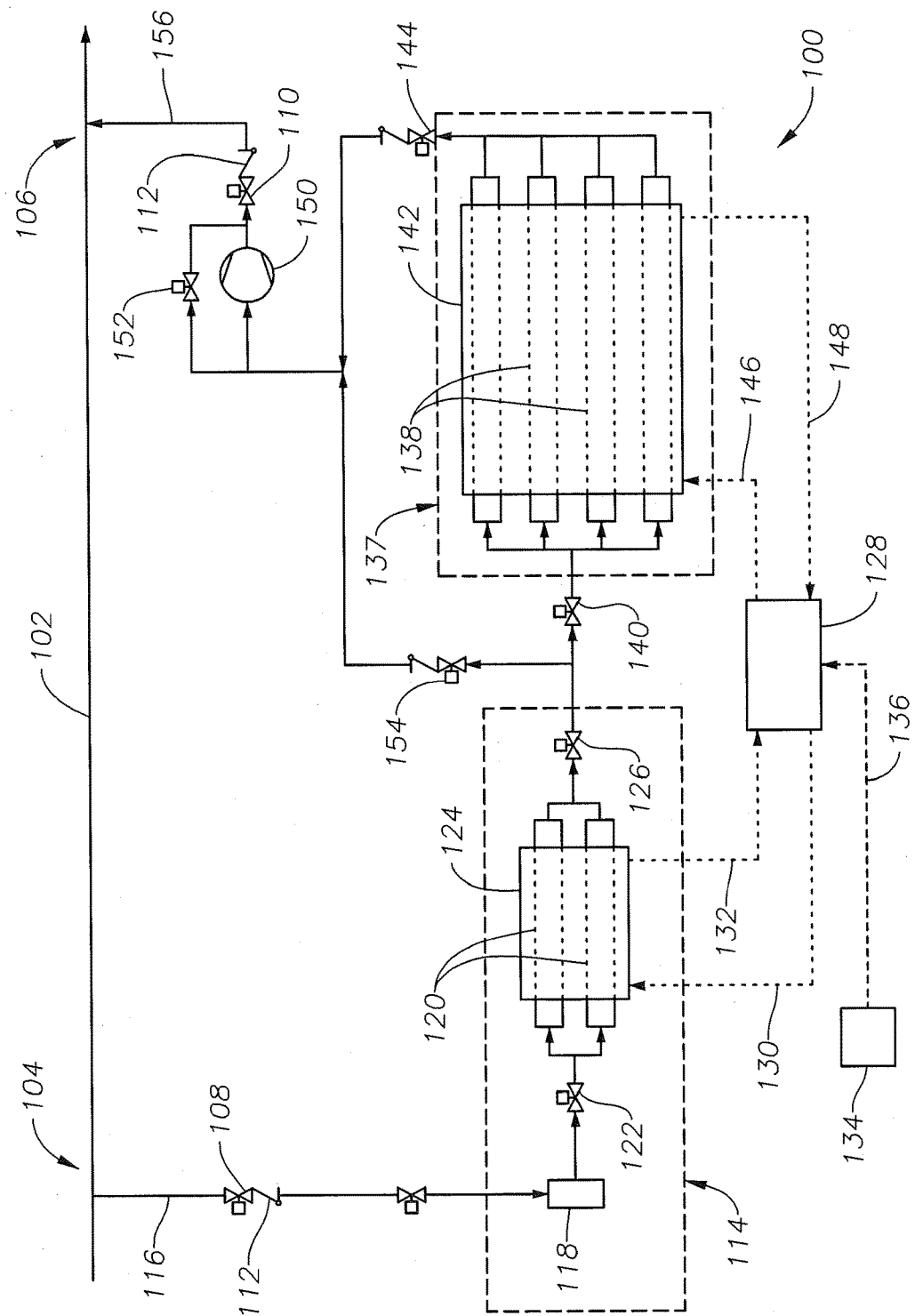
FIG. 1 is a process flow diagram of one embodiment of a natural gas storage facility.

The Figures are general schematics of an embodiment of the natural gas storage facility. The Figures and its description facilitate a better understanding of the natural gas storage facility and its method of use. In no way should the Figures limit or define the scope of the invention. The Figures are a simple diagram for ease of description. Those of ordinary skill in the art understand that such systems are complex structures with ancillary equipment and subsystems that render them operable for their intended purpose.

DETAILED DESCRIPTION OF THE PREFERRED EMBODIMENTS

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur. "Operable" and its various forms means fit for its proper functioning and able to be used for its intended use. "Associated" and its various forms means something connected with something else because they occur together or that one produces the other.

Spatial terms describe the relative position of an object or a group of objects relative to another object or group of objects. The spatial relationships apply along vertical and horizontal axes. Orientation and relational words like "upstream" and "downstream" are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The invention encompasses and bounds smaller ranges of the interval subject to any specific exclusion provided. "Substantially free" means less than 1% by the indicated unit of measure. "Detectable amount" means 0.01% by the indicated unit of measure.

Where the Specification and appended Claims reference a method comprising two or more defined steps, the defined steps can be carried out in any order or simultaneously except where the context excludes that possibility.

When a patent or a publication is referenced in this disclosure, the reference is incorporated by reference and in its entirety to the extent that it does not contradict statements made in this disclosure.

FIG. 1

FIG. 1 is a process flow diagram of an embodiment of the natural gas storage facility. Natural gas storage facility 100 couples to CNG pipeline 102, a natural gas source, at upstream connection point 104 and downstream connection point 106. Upstream isolation valve 108 and downstream isolation valve 110 can fluidly isolate natural gas storage facility 100 from CNG pipeline 102 upon closing. Check valves 112 provide additional assurance that any fluid flow through natural gas storage facility 100 is one-way from upstream connection point 104 to downstream connection point 106.

Guard bed system 114 (dashed outline) couples to CNG pipeline 102 through inlet conduit 116. Guard bed system 114 includes both impurity separator 118 and two guard adsorber 120. FIG. 1 shows two separate guard adsorber 120 in a parallel configuration. Impurity separator 118 operates to remove natural gas impurities from incoming natural gas. Impurity separator 118 couples to guard adsorber 120 through guard adsorber inlet isolation valve 122. Guard adsorber 120 operates to separate incoming natural gas into heavy natural gas components and light natural gas components and to retain the heavy natural gas component during the period of non-peak demand. Guard adsorber thermal jacket 124 surrounds the exterior of both guard adsorber 120. Guard bed system 114 has guard adsorber outlet isolation valve 126 at the flow outlet of guard adsorber 120.

Natural gas storage facility 100 includes temperature control system 128. Temperature control system 128 couples to guard adsorber thermal jacket 124. Temperature control system 128 controls, maintains and modifies the internal temperature of guard adsorber 120. Temperature control system 128 maintains the temperature of guard adsorber 120 by introducing temperature-modifying fluids into guard adsorber thermal jacket 124 via guard bed supply conduit 130. Heat transfers to and from the temperature-modifying fluid in guard adsorber thermal jacket 124 to support the separation of the heavy natural gas component from the light natural gas component and the retention and release of the heavy natural gas component from the heavy natural gas adsorbent (not shown) contained in guard adsorber 120. Spent temperature modifying fluid returns from guard adsorber thermal jacket 124 to temperature control system 128 via guard bed return conduit 132.

Solar power array 134 electrically couples to temperature control system 128 through electrical power conduit 136. Solar power array 134 provides electrical power such that temperature control system 128 satisfies the temperature regulation requirements of natural gas storage facility 100 during both the peak and non-peak period of demand.

Guard bed system 114 fluidly couples to adsorption bed system 137 (dashed outline) through guard adsorber outlet isolation valve 126 and adsorption beds inlet isolation valve 140. FIG. 1 shows adsorption bed system 137 having four separate adsorption bed 138 in parallel. Each adsorption bed 138 contains the light natural gas adsorbent (not shown) for retaining the light natural gas component during the non-peak period of demand. Adsorption bed thermal jacket 142 surrounds the exterior of and regulates the internal temperature of adsorption bed 138. Desorbed light natural gas component passes from adsorption bed 138 through outlet isolation valve 144.

Temperature control system 128 couples to adsorption bed thermal jacket 142. Temperature control system 128 controls, maintains and modifies the internal temperature of adsorption bed 138. Temperature control system 128 introduces temperature-modifying fluids into adsorption bed thermal jacket 142 via adsorption bed supply conduit 146. Heat transfers to and from the temperature-modifying fluid in adsorption bed thermal jacket 142 to support the adsorption and desorption of the light natural gas component from the light natural gas adsorbent (not shown) contained in adsorption bed 138. Spent temperature modifying fluid returns from adsorption bed thermal jacket 142 via adsorption bed return conduit 148.

In FIG. 1, guard bed system 114 couples to both storage facility compressor 150 and compressor bypass valve 152 through guard bed discharge isolation valve 154. Adsorption bed system 137 also couples to storage facility compressor 150 and compressor bypass valve 152 via adsorption bed outlet isolation valve 144. Both storage facility compressor 150 and compressor bypass valve 152 provide access to CNG pipeline 102 from guard adsorber 120 and adsorption bed 138. Storage facility compressor 150 is operable to pressurize and introduce the released heavy natural gas component and the released light natural gas component, either separately or together, into CNG pipeline 102 through discharge conduit 156. Compressor bypass valve 152 permits access CNG pipeline 102 through discharge conduit 156. Storage facility compressor 150 is operable of reduce the pressure in guard adsorber 120 and adsorption bed 138 separately or simultaneously depending on valve configuration to facilitate desorption.

During the non-peak period of demand, a detectable condition triggers natural gas storage facility 100 to operate the isolation valves, including upstream isolation valve 108, guard adsorber inlet isolation valve 122, guard adsorber outlet isolation valve 126 and adsorption beds inlet isolation valve 140, such that a fluid pathway forms between CNG pipeline 102, guard bed system 114 and guard adsorber 120.

Pressure differences between CNG pipeline 102 and guard bed system 114 motivates natural gas to flow from CNG pipeline 102 into impurity separator 118. Impurity separator 118 operates to remove any impurities in the introduced natural gas before it passes into guard adsorber 120. Pressure differential motivates the introduced natural gas to flow from impurity separator 118 into one or more of guard adsorber 120. At reduced temperatures and increasing pressure (as more natural gas flows into natural gas storage facility 100), the heavy natural gas component of the introduced national gas is selectively separated from the introduced natural gas and is retained in guard adsorber 120.

The light natural gas component forms as a residual of the separated natural gas. The light natural gas component passes from guard bed system 114 and into one or more adsorption bed 138. The light natural gas adsorbent, maintained at a reduced temperature by adsorption bed thermal jacket 142, adsorbs the light natural gas component.

Temperature control system 128 supplies temperature-modifying fluid to guard adsorber thermal jacket 124 and adsorption bed thermal jacket 142 to facilitate the selective separation of the introduced natural gas into the heavy natural gas component and the light natural gas component, the retention of the heavy natural gas component in guard adsorber 120 and the adsorption of the light natural gas component onto the light natural gas adsorbent in adsorption bed 138.

Either at the end of the non-peak period of demand or when some other detectable condition occurs and is detected, upstream isolation valve 108, guard adsorber inlet isolation valve 122, guard adsorber outlet isolation valve 126 and adsorption beds inlet isolation valve 140 close to isolate natural gas storage facility 100 from CNG pipeline 102. Temperature control system 128 continues to maintain a reduced storage temperature for guard adsorber 120 and adsorption bed system 137 such that the heavy natural gas component remains in guard adsorber 120 and the light natural gas component remains in adsorption bed 138.

During the peak period of demand, a condition detected by natural gas storage facility 100 causes it to operate isolation valves, including guard adsorber outlet isolation valve 126, adsorption bed outlet isolation valve 144, guard bed discharge isolation valve 154 and downstream isolation valve 110, such that fluid pathways between both guard bed system 114 and CNG pipeline 102 and guard adsorber 120 and CNG pipeline 102 form. Temperature control system 128 operates to provide temperature-modifying fluid to guard adsorber thermal jacket 124 and adsorption bed thermal jacket 142 such that a temperature is maintained in guard adsorber 120 that facilitates release of the heavy natural gas component and such that a temperature is maintained in adsorption bed 138 such that the light natural gas component desorbs from the light natural gas adsorbent.

Introduction of the desorbed natural gas components into CNG pipeline 102 from guard adsorber 120 or adsorption bed 138, or both, occurs without the need of compressive assistance by opening compressor bypass valve 152. If a suitable difference in pressure between guard bed system 114 and CNG pipeline 102 exists, the released heavy natural gas component flows from guard bed system 114 into CNG pipeline 102. Similarly, if a suitable difference in pressure between adsorption bed 138 and CNG pipeline 102 exists, the desorbed light natural gas components flow from guard bed system 114 into CNG pipeline 102. Otherwise, closing compressor bypass valve 152 and operating storage facility compressor 150 provides the required motivation to the released natural gas components.

The operation of storage facility compressor 150 is useful to create a sub-atmospheric pressure or "partial vacuum" in either guard bed system 114 or adsorption bed 138, or both. Upon closing either guard adsorber outlet isolation valve 126 or guard bed discharge isolation valve 154 while forming the partial vacuum condition results in guard adsorber 120 internally retaining the sub-atmospheric condition. Closing adsorption bed outlet isolation valve 144 during the partial vacuum condition causes adsorption bed 138 to retain the sub-atmospheric pressure condition.

Other natural gas storage facility 100 operations include operating temperature control system 128 such that it provides heating or cooling, shutting down storage facility compressor 150, opening isolation valves between guard adsorber 120 and adsorption bed 138 to equalize pressure and closing all other remaining isolation valves to natural gas storage facility 100.

Microporous Material

The adsorption bed system includes the light natural gas adsorbent. The light natural gas adsorbent is a microporous material. An embodiment of the natural gas storage facility includes the guard bed system having a heavy natural gas adsorbent made of a microporous material.

The microporous material used in the natural gas storage facility is operable to adsorb and desorb components of natural gas based upon the overall environmental conditions present, current saturation level and changes to the overall environmental conditions. This permits adsorption of the light natural gas components during the non-peak period of demand, retention of the natural gas components from the period of non-peak demand to the period of peak demand and release of the natural gas components during the peak period of demand. A useful microporous material includes microporous material having a high adsorption capacity for methane. A useful microporous material includes microporous materials having a high adsorption capacity for ethane. Examples of microporous materials include activated carbons, metal organic frameworks (MOFs), zeolites, molecular sieves, carbon fibers and carbon nanotubes.

The bulk density of microporous materials depends on many structural factors, including particle shape, particle density and binding materials. Useful activated carbon materials have a bulk density is in a range of from about 0.20 to about 0.75 grams per cubic centimeter ($g/cm^3$). Useful metal oxide frameworks (MOFs) have a bulk density value that is equal to or greater than about 0.15 $g/cm^3$. Useful activated carbon microporous materials have slit-shaped micropores.

Examples of specific embodiments facilitate a better understanding of microporous materials that are useful as part of a natural gas storage facility. In no way should the following discussion regarding microporous materials limit or define the scope of the invention.

Surface characterization can assist in determining suitable heavy natural gas adsorbent materials and light natural gas adsorbent materials for use in natural gas storage facilities. Table 1 shows surface and pore properties of adsorbent materials activated carbons 1-5 (AC 1-5) and a metal-oxide framework (MOF 1). All of the activated carbons have "slit" shaped micropores. In Table 1, "N/A" means "not available".

Several different testing procedures, which those of ordinary skill in gas adsorption research understand and appreciate, provide surface characteristics for activated carbons 1-5 (AC 1-5) and the metal organic framework presented in Table 1. The article by Wang, et al., "Experimental and Theoretical Study of Methane Adsorption on Granular Activate Carbons", AIChE Journal 782-788 (Vol. 58, Issue 3) ("Wang") describes a process and an apparatus for characterizing adsorbent materials using nitrogen porosimetry at 77° K and mercury porosimetry. ASTM International standard D2862 provides the method for determining "ASTM Mesh Size". BET (Brunauer-Emmett-Teller) analysis provides specific surface area of the adsorbent materials as a function of relative nitrogen pressure. BJH (Barrett-Joyner-Halenda) analysis determines pore area of an adsorbent material using nitrogen adsorption and desorption techniques, which reveals pore diameter. An Angstrom (Å) is a unit of measure equal to $1 \times 10^{-10}$ of a meter.

TABLE 1

Surface and pore properties of adsorbent materials activated carbons 1-5 (AC 1-5) and a metal-oxide framework 1 (MOF 1).

| Sample | Units | AC 1 | AC 2 | AC 3 | AC 4 | AC 5 | MOF 1 |
|---|---|---|---|---|---|---|---|
| ASTM Mesh Size | — | 8 × 16 | 30 × 70 | 2 × 60 | 12 × 40 | 6 × 60 | Pellet (3 × 3) |
| Bulk Density | g/cm$^3$ | 0.47 | 0.39 | 0.49 | 0.54 | 0.50 | 0.187 |
| Skeletal Density | g/cm$^3$ | 2.299 | 2.363 | 2.402 | 2.059 | 2.286 | 1.817 |
| Nitrogen Porosimetry (77° K) | | | | | | | |
| BET Specific Surface Area | m$^2$/g | 1235 | 1589 | 1426 | 999 | 1510 | 867 |
| Total Pore Volume | cm$^3$/g | 0.629 | 0.747 | 0.599 | 0.500 | 0.682 | 0.633 |
| Micropore Volume | cm$^3$/g | 0.600 | 0.706 | 0.560 | 0.456 | 0.451 | 0.336 |
| BJH Average Pore Width | Å | 18.00 | 18.70 | 17.47 | 20.64 | 26.08 | 107.038 |
| Mercury Porosimetry | | | | | | | |
| Total Pore Volume | cm$^3$/g | 0.388 | 0.457 | 0.360 | 0.314 | N/A | N/A |
| Mesopore Volume | cm$^3$/g | 0.182 | 0.205 | 0.164 | 0.137 | N/A | N/A |
| Macropore Volume | cm$^3$/g | 0.205 | 0.252 | 0.194 | 0.176 | N/A | N/A |

Table 1 shows the characterization of several useful microporous materials. A useful microporous material has both a BET Specific Surface Area value of at least 800 meters squared per gram (m$^2$/g) and a Micropore Volume value of at least 0.300 centimeters cubed per gram (cm$^3$/g) of microporous material as determined using nitrogen porosimetry at 77° K. Table 1 also shows several useful activated carbon microporous materials having a BJH Average Pore Width in a range of from about 10 to about 30 Angstroms (Å) as determined using nitrogen porosimetry at 77° K.

Figure 2:
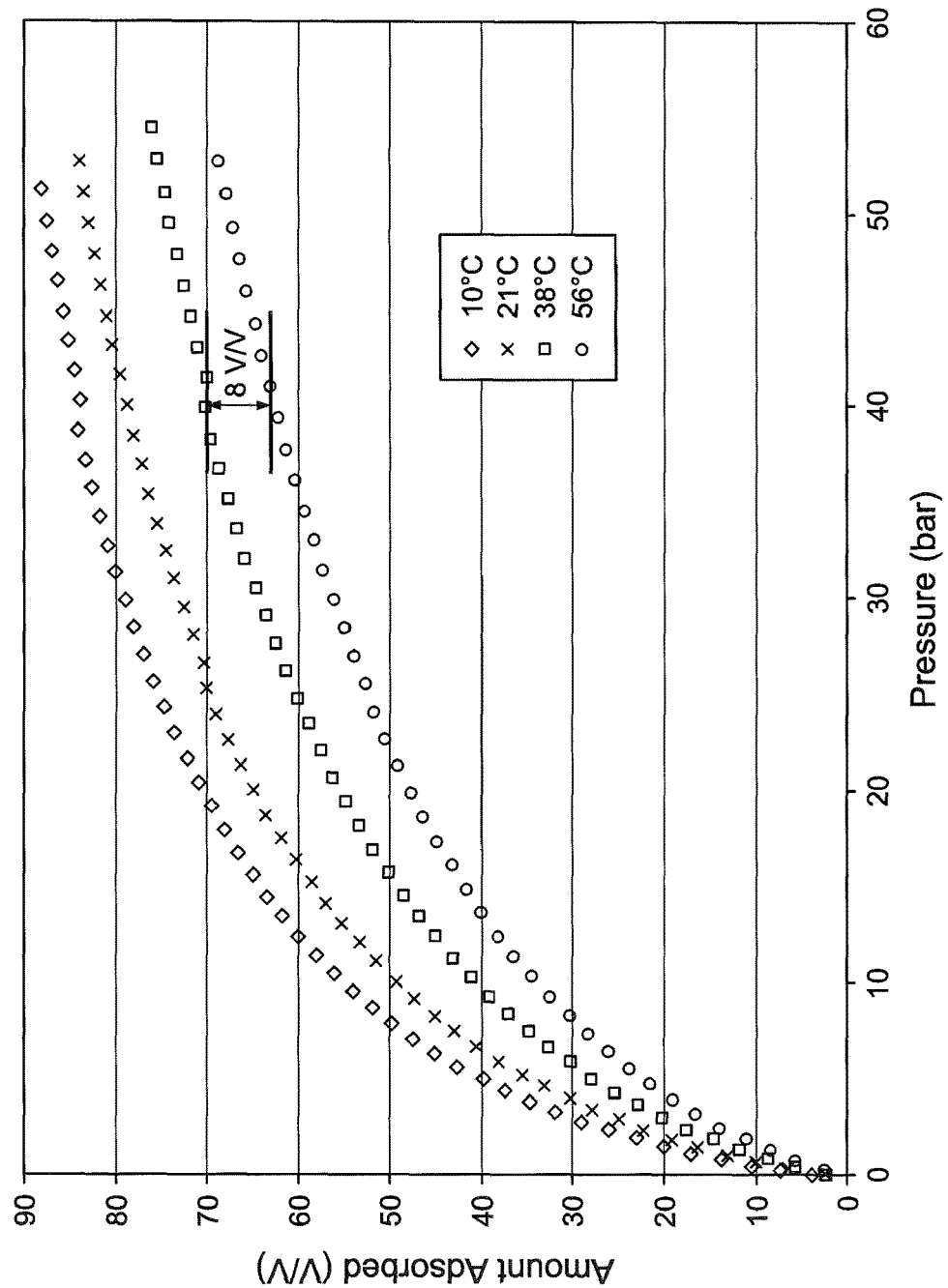
FIG. 2 shows several methane isothermic trends for AC3, a useful activated carbon microporous material.
Figure 3:
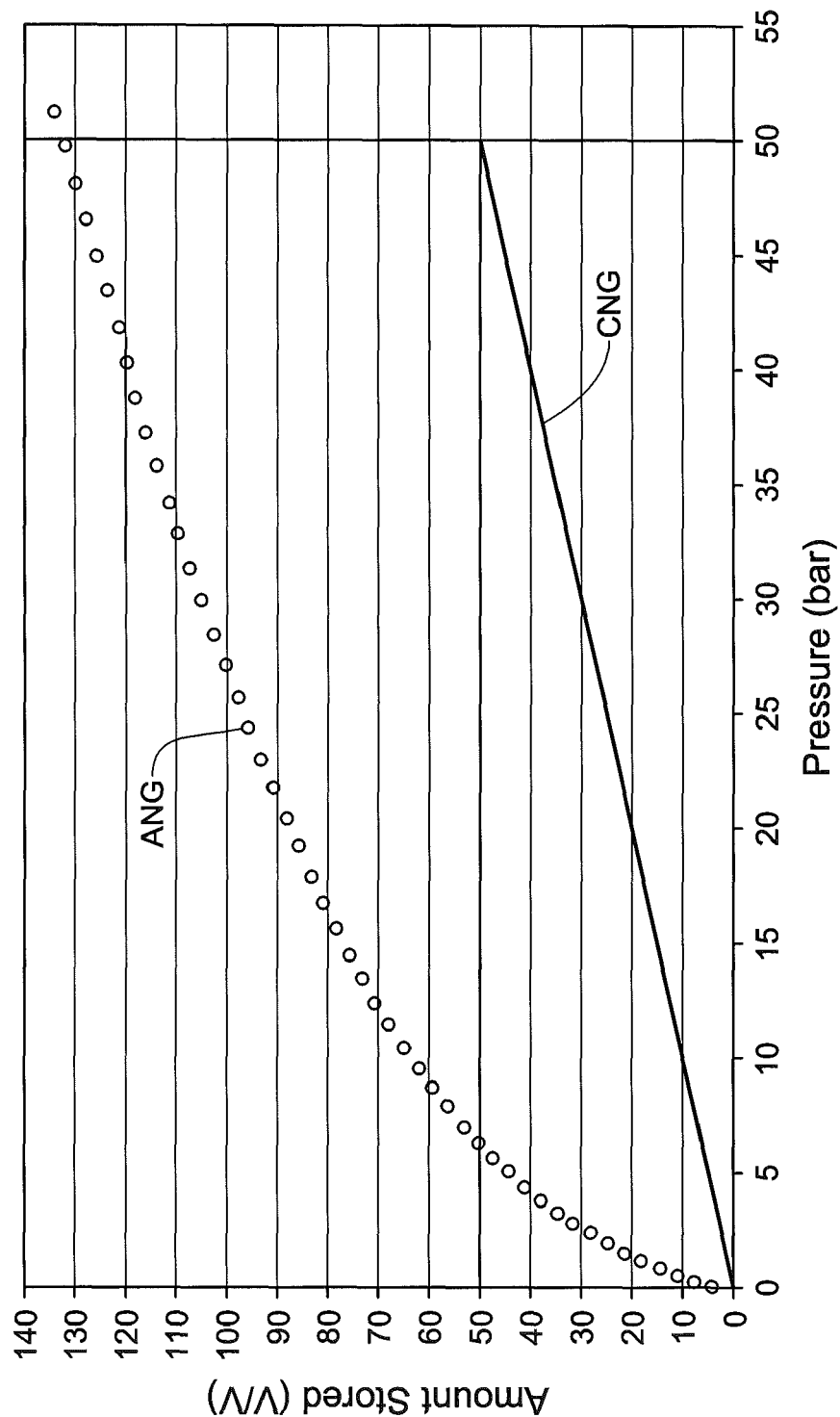
FIG. 3 shows two isothermic volume storage trends for a fixed volume vessel and a similar fixed volume vessel containing useful microporous material AC3.

FIGS. 2 and 3 show general properties for several useful microporous materials. FIG. 2 shows for demonstration purposes several methane isothermic trends for AC3, a useful activated carbon microporous material. Wang provides a description of the testing procedures and the apparatus for determining volume-based adsorption isotherms for microporous materials using methane. The evaluation pressure is from 0 bar to about 55 bars. The isothermic trends are at 10° C., 21° C., 39° C. and 56° C. The "adsorbed amount" is the ratio of the volume of methane at standard conditions (1 bar; 21° C.) adsorbed onto the microporous material per bulk volume of microporous material. The adsorbed amount ratio is a volume ratio and therefore does not have units of measure. All values assume methane adsorption.

The isothermic trends of FIG. 2 show generally several volume/adsorption relationships for the useful microporous materials. For the given pressure range, methane adsorbs in greater quantities at higher relative pressure values. For the given temperature range, decreasing temperatures permit greater adsorption onto the microporous material.

FIG. 2 shows AC3 microporous material at 40 bars of system pressure having an adsorbed amount ratio of about 84 at 10° C., about 79 at 21° C., about 70 at 39° C. and about 62 at 56° C. At 40 bars of system pressure, the microporous material is operable to adsorb about 8 additional volumes at standard conditions of methane by reducing the temperature of the micropore adsorbent material from 56° C. to 39° C. AC3 microporous material at 50 bars of system pressure has an adsorbed amount ratio of about 88 at 10° C., about 84 at 21° C., about 74 at 39° C. and about 67 at 56° C.

An embodiment of the natural gas storage facility includes the microporous material that has an adsorbed amount ratio greater than about 60 at 40 bars of system pressure and an adsorbed amount ratio greater than about 65 at 50 bars of system pressure at 56° C. An embodiment of the natural gas storage facility includes the microporous material that has an adsorbed amount ratio greater than about 100 in a pressure range of from 35 bars to 50 bars at 21° C. All values assume methane adsorption.

FIG. 3 shows for demonstration purposes two isothermic volume storage trends for a fixed volume vessel and a similarly fixed volume vessel containing useful microporous material AC3. Wang describes the testing apparatus and procedure for determining the total amount of methane stored in each fixed volume used on a volume/volume basis. The evaluation pressure range is from 0 bar to 55 bar. The isothermic trends shown are at 21° C. The "amount stored" is a ratio of the volume of methane stored in the fixed vessel per unit volume of the fixed vessel, which contains the microporous adsorbed material. The stored amount ratio is a volume ratio and therefore does not have units of measure.

FIG. 3 indicates that the fixed vessel filled with AC3 microporous material is operable to store methane at 21° C. and 50 bars of system pressure at a stored amount ratio of about 132, about 126 at 45 bars of system pressure and about 119 at 40 bars of system pressure.

An embodiment of the natural gas storage facility includes a microporous material that has a stored amount ratio greater than about 115 at 50 bars of system pressure, greater than about 110 at 45 bars of system pressure and greater than about 100 at 40 bars system pressure. An embodiment of the natural gas storage facility includes the microporous material that has a stored amount ratio greater than about 100 in a pressure range of from 35 bars to 50 bars. All values assume methane adsorption at 21° C.

Natural Gas Storage Facility

The natural gas storage facility includes the guard bed system and the adsorption bed system. The adsorption bed system contains the light natural gas adsorbent. The light natural gas adsorbent is a microporous material. An embodiment of the natural gas storage facility includes the heavy natural gas adsorbent in the guard bed system. An embodiment of the natural gas storage facility includes the heavy natural gas adsorbent that is a microporous material. An embodiment of the natural gas storage facility includes the temperature control system. An embodiment of the natural gas storage facility includes the storage facility compressor.

Introduced Natural Gas

The natural gas storage facility couples to the natural gas source. The natural gas source introduces natural gas to the natural gas storage facility during the non-peak period of demand. The natural gas storage facility introduces natural gas components to the natural gas source during the peak period of demand.

The natural gas storage facility is operable to process of a variety of gaseous and vaporized hydrocarbon-bearing feeds from the natural gas source. Examples of natural gases include wet natural gas, dry natural gas, casinghead or associated gas and vaporized condensate. The introduced natural gas can be a naturally-originating material or a synthetic composition of several hydrocarbon gases previously treated or separated, including methane, ethane (C2), LNG (that is a mixture of methane and ethane), propane (C3), butanes, LPG (that is, a mixture of propane and butanes), pentanes and hexanes.

It is preferable that the introduced natural gas does not form either hydrocarbon or non-hydrocarbon liquids at the operating conditions of the natural gas storage facility. Condensation and evaporation can damage both the selective separations and adsorbent materials.

Natural gases for electrical power production and consumers typically contain C1-5s alkanes, with a majority of the composition as methane followed by ethane. Even with prior treatment, natural gas usually contains minor amounts of non-hydrocarbon contaminants. Potential contaminants include "inert" gases (for example, nitrogen, oxygen, helium, argon, neon and helium), acid gases (for example, hydrogen sulfide and carbon dioxide), heterorganic compounds (for example, mercaptans, sulfides and disulfides), water (vaporized, aspirated), solids (for example, sand, iron rust, "black powders", elemental sulfurs, arsenic and mercury compounds, and salts) and well-treatment chemicals (for example, methanol, amine compounds, and glycols). The impurities can range in concentration from a few parts-per-billion (ppb) to a few parts-per-thousand (ppt). Non-hydrocarbon impurities can chemically react with, condense or adsorb onto the surface of the heavy natural gas adsorbent and the microporous materials. Over time, repeated exposure to impurities can shorten the lifespan of the heavy natural gas adsorbents and other microporous materials, which are expensive and difficult to replace.

Guard Bed System

The natural gas storage facility includes the guard bed system. The guard bed system is operable to remove impurities from the introduced natural gas during the non-peak period of demand. The guard bed system is also operable to selectively separate the introduced natural gas into the heavy natural gas component and the light natural gas component. The guard bed system is also operable to retain the heavy natural gas component. An embodiment of the natural gas storage facility includes the guard bed system that contains the heavy natural gas adsorbent. An embodiment of the natural gas storage facility includes the heavy natural gas adsorbent where the heavy natural gas adsorbent is a microporous material. The guard bed system is also operable to release the heavy natural gas component.

The guard bed system is operable to remove impurities from the introduced natural gas during the non-peak period of demand. The guard bed system does not reintroduce removed impurities back into the released heavy natural gas component. Impurity removal means includes units specialized for specifically separating out certain natural gas impurities, for example, calcium chloride solid desiccant for removing water from the introduced natural gas. Useful impurity removal systems extract more than one impurity at a time. Useful multicomponent-removal systems are operable to cleanse polar impurities as well as inorganic materials from the introduced natural gas. Impurity removal means can include one or more impurity-removing materials, including solid desiccants, filters, silica gels, silica-based beads, activated alumina, activated bauxite, molecular sieves with crystalline zeolites or metal alumino-silicates and activated or non-activated carbons.

The guard bed system is operable to selectively separate the introduced natural gas into the heavy natural gas component and the light natural gas components. Preventing alkanes that have three or more carbons from entering the adsorption bed system acts to protect the light natural gas adsorption bed from damaging hydrocarbon condensation caused by higher-order alkanes at the operating temperature of the adsorption bed system. Repeated condensation and vaporization of the heavy natural gas component can negatively affect the long-term performance of the light natural gas adsorbent material. It also maximizes the light natural gas component storage capacity of the natural gas storage facility by allowing the temperature of the light natural gas adsorbent to be lower than the temperature of condensation of the higher-order alkanes while avoiding their adsorption onto the light natural gas adsorbent.

An embodiment of the natural gas storage facility includes the guard bed system that is operable to selectively separate the introduced natural gas into the heavy natural gas component having C3+ hydrocarbons and the light natural gas component having methane and ethane and that is substantially free of propane. An embodiment of the natural gas storage facility includes the guard bed system that is operable to selectively separate the introduced natural gas into the heavy natural gas component having C2+ hydrocarbons and the light natural gas component having methane and that is substantially free of ethane. Means for hydrocarbon separation in the guard bed system include cryogenic separations, lean oil solutions, membranes, adsorption towers, and pressure-swing-adsorption (PSA) units.

An embodiment of the natural gas storage facility includes the guard bed system that is operable to filter natural gas impurities from the introduced natural gas and to selectively separate the introduced natural gas into the natural gas components simultaneously. The guard bed system removes polar and inorganic impurities as well as non-polar heavy natural gas components from the introduced natural gas. The polar and inorganic impurities strongly adsorb onto the separations materials, which traps the impurities. The non-polar organic materials, including alkanes, are temporarily retained on the surface and then released from the separations materials in a repeating adsorb/desorb pattern at the operating conditions of the guard bed system. The adsorption and release from the separations material occurs at different rates depending on the separations material and the chemical makeup of the alkane, which eventually leads to fractionation of the introduced natural gas into the heavy natural gas component and the light natural gas component. This occurs as the introduced natural gas moves through the guard bed system. The light natural gas component, adsorbing and desorbing quickly, passes through the guard bed system before the heavy natural gas component, which is retained on the surface of the guard bed system for longer periods. Adsorption towers or vessels and PSAs containing alumina, silica gel or molecular sieves are examples of useful systems for not only removing impurities from the introduced natural gas but also separating the introduced natural gas into the light natural gas component and the heavy natural gas component. Thermal regeneration of the guard bed system typically restores both its impurity removal capability and its selective separation capacity.

The guard bed system is also operable to retain the heavy natural gas component. The guard bed system can include a dedicated storage facility that is operable to store the heavy natural gas component. Examples of dedicated storage facilities include tanks, bullets and vessels. The guard bed system can retain the heavy natural gas component as a compressed gas, a cryogenic liquid or as a saturated oil or solvent.

An embodiment of the natural gas storage facility includes the guard bed system that contains the heavy natural gas adsorbent and is operable to adsorb the heavy natural gas component. An adsorption storage system requires less energy and capital expenditure than a similar capacity cryogenic or compression storage system. The heavy natural gas adsorbent is operable to adsorb and desorb the heavy natural gas component based upon the relative environmental conditions and adsorbent saturation level. The heavy natural gas adsorbent includes any porous material that has a capacity for adsorbing natural gas, including activated carbons, metal organic frameworks (MOFs), zeolites, molecular sieves, carbon fibers and carbon nanotubes. The physical structure of the heavy natural gas component storage vessels, the adsorption capacity of the heavy natural gas adsorbent and the retention conditions determines the total heavy natural gas storage capacity for the guard bed system.

The heavy natural gas adsorbent can be a microporous material. A useful heavy natural gas adsorbent for an embodiment of the natural gas storage facility have a stored amount ratio of methane greater than about 100 in a pressure range of from 35 bar to 55 bar at a temperature of 21° C.

An embodiment of the natural gas storage facility includes the guard bed system that uses the heavy natural gas adsorbent such that it is operable to remove impurities from the introduced natural gas, to selectively separate introduced natural gas into the heavy natural gas component and the light natural gas component and to retain the heavy natural gas component adsorbed during the non-peak period of demand. The retention conditions may be the same or different from the separations and purification conditions. The guard bed system configuration can include dedicated vessels containing the heavy natural gas component adsorbents coupled in series or parallel, or both.

The guard bed system is operable to permit fluid isolation of the guard bed. Isolation of the guard bed allows for maintaining the heavy natural gas component at the conditions of retention until the period of peak demand.

Adsorption Bed System

The natural gas storage facility includes the adsorption bed system. The natural gas storage facility is operable to introduce the light natural gas component to the adsorption bed system during the period of non-peak demand. The adsorption bed system is operable to adsorb and retain the light natural gas component. The light natural gas adsorbent is a microporous material. The adsorption bed system is operable to desorb the light natural gas component during the period of peak demand.

The adsorption bed system includes one or more adsorption beds in series or parallel, or both. An embodiment of the natural gas storage facility includes the adsorption bed system that is operable to selectively separate and adsorb ethane and methane into different adsorption beds.

The natural gas storage facility is operable to pass the released light natural gas component from the adsorption bed system to the natural gas source during the period of peak demand. An embodiment of the natural gas storage facility includes the guard bed system coupled to the adsorption bed system such that the released light natural gas component passes into the guard bed system. Such a facility configuration can purge the guard bed system or mix the released light natural gas component with the releasing heavy natural gas component, forming the released natural gas product.

The adsorption bed system has a light natural gas storage capacity. The physical structure of the light natural gas component storage vessel and the adsorption capacity of the light natural gas adsorbent at the retention conditions determine the total light natural gas storage capacity.

Temperature Control System

In most parts of the world, and especially during seasonal temperature peaks and troughs that occur in summers and winters, the optional temperature control system can assist in optimizing adsorption, retention and desorption performance. An embodiment of the natural gas storage facility includes the temperature control system.

The temperature control system is operable to regulate the internal temperature of the guard bed system, adsorption bed system or both. Both temperature and pressure affect the rate of retention and release of as well as the overall storage capacity for the natural gas components, especially the light natural gas adsorbent and, if present, the heavy natural gas adsorbent. FIGS. 2 and 3 demonstrate this effect. The adsorption of hydrocarbons is exothermic; desorption is endothermic. The temperature control system assists in maximizing the overall storage capacity of the guard bed system or adsorption bed system, or both, by removing the heat of adsorption from the adsorption bed. The temperature control system assists in minimizing the overall storage capacity of the guard bed system or adsorption bed system, or both, by introducing heat into the adsorption bed.

A useful embodiment of the natural gas storage facility includes the temperature control system that is operable to regulate the temperature of the guard bed system and the adsorption bed system separately. An example includes having a first temperature control system that monitors and maintains the temperature of the guard bed system and a second temperature control system that monitors and maintains the temperature of the adsorption bed system. An embodiment of the natural gas storage facility includes the temperature control system that is operable to maintain the temperature of each adsorption bed independently to minimize power consumption and maintain control over the storage units.

The operation of the temperature control system does not cause condensation or adsorption of the light natural gas component in the guard bed system. The temperature of the guard bed system is maintained at a higher temperature than the adsorption bed system temperature to prevent retention of light natural gas components in the guard bed system.

Using alternative energy generation to provide power to the natural gas storage facility permits flexibility in locating the facility. Alternative energy power generation can facilitate the operation of the temperature control system, including the operation of computer monitoring systems and movement of control valves, heating and cooling heat transfer fluid, the compression of fluids and directly heating and cooling storage units. Alternative energy power increases the net utility benefit of the natural gas storage facility. Power provided directly from the alternative energy power sources during the time when power is generated or from capacitor banks charged by the alternative energy power source during non-generation times can reduce the operational "environmental footprint" of the temperature control system. Examples of useful alternative energy power generators include solar cells, solar furnaces and wind turbines.

Storage Facility Compressor

An embodiment of the natural gas storage facility includes the storage facility compressor. The optional storage facility compressor couples to the guard bed system, the adsorption bed system or both.

The storage facility compressor is operable to pressurize the natural gas components releasing from the storage facility for introduction into the natural gas source. The storage facility compressor is also operable to regulate the pressure of the guard bed system and the adsorption bed system, either individually or collectively. The storage facility compressor is operable to reduce the pressure in either bed system below atmospheric pressure such that each bed system is sufficiently free of hydrocarbons. Reducing the pressure of bed systems below atmospheric pressure facilitates the release of the natural gas components from the bed systems, including adsorption materials. An embodiment of the natural gas storage facility includes the storage facility compressor that is operable to create a partial vacuum condition in the guard bed system. An embodiment of the natural gas storage facility includes the storage facility compressor that is operable to create a partial vacuum condition in the adsorption bed system.

The storage facility compressor is operable to mix desorbed heavy natural gas component and desorbed light natural gas component together within the compression chamber and in the turbulent flow discharge region downstream of the compressor such that the desorbed natural gas product forms.

The storage facility compressor can be in series or parallel depending on the compression requirements and operational flexibility of the natural gas storage facility.

Alternative energy power generation can facilitate the operation of the optional storage facility compressor.

Supporting Equipment

Embodiments include many additional standard components or equipment that enables and makes operable the described apparatus, process, method and system. Examples of such standard equipment known to one of ordinary skill in the art includes heat exchanges, pumps, blowers, reboilers, steam generation, condensate handling, membranes, single and multi-stage compressors, separation and fractionation equipment, valves, switches, controllers and pressure-, temperature-, level- and flow-sensing devices.

Operation, control and performance of portions of or entire steps of a process or method can occur through human interaction, pre-programmed computer control and response systems, or combinations thereof.

Peak and Non-Peak Periods of Demand

The peak period of demand and the non-peak period of demand on the natural gas source reflect different times of operation for the natural gas storage facility. The natural gas source is typically a natural gas transportation system; however, gas sweetening plants, wellheads, mobile and fixed storage facilities can act as the natural gas source. A natural gas transportation system, which is a source of natural gas, includes natural gas pipelines and networks that provide natural gas to consumers and electrical generators. The natural gas source has a fixed volume.

The peak and non-peak periods of demand are detectable by observing conditions associated with the source of natural gas or external environmental conditions, or both. The peak period of demand reflects a higher rate or level of distribution from than introduction into the natural gas source. Because the natural gas source has a fixed volume, a detectable condition associated with the peak period of demand includes a decrease in natural gas source pressure over time, which can indicated that the demand for natural gas is outpacing supply. The non-peak period of demand reflects a lower rate or level of distribution from than introduction into the natural gas source. A detectable condition associated with the non-peak period of demand includes an increase in natural gas source pressure over time, which can indicate supply outpacing demand.

Other detectable conditions associated with the natural gas source are useful in determining the beginning or end of the peak period of demand. Examples of useful detectable conditions associated with the beginning of the peak period of demand include a natural gas source system pressure higher than a daily average pressure or higher than a pre-determined pressure value that is greater than the daily average pressure; a rate of decline of natural gas source pressure at or greater than a pre-determined rate of decline value; and a flow rate from the natural gas source greater than a daily average flow rate or greater than a pre-determined flow rate value. Examples of useful detectable conditions that are associated with the end of the peak period of demand include a natural gas source system pressure less than the daily average pressure, less than the pre-determined pressure value that is higher than the daily average pressure or less than the pre-determined pressure value that is lower than the daily average pressure; a rate of incline of natural gas source pressure at or greater than a pre-determined rate of incline value; and a flow rate from the natural gas source lower than the daily average flow rate or less than a pre-determined flow rate value.

Other detectable conditions with the natural gas source are also useful in determining the beginning or end of the non-peak period of demand. Examples of useful detectable conditions related to the natural gas source that are associated with the beginning of the non-peak period of demand include a natural gas source system pressure higher than a daily average pressure or higher than a pre-determined pressure value that is higher than the daily average pressure; a rate of decline of natural gas source pressure at or greater than a pre-determined rate of decline value; and a flow rate from the natural gas source greater than a daily average flow rate or greater than a pre-determined flow rate value. Examples of useful detectable conditions related to the natural gas source that are associated with the end of the peak period of demand include a natural gas source system pressure less than the daily average pressure, less than the pre-determined pressure value that is higher than the daily average pressure or less than the pre-determined pressure value that is lower than the daily average pressure; a rate of incline of natural gas source pressure at or greater than a pre-determined rate of incline value; and a flow rate from the natural gas source lower than the daily average flow rate or less than a pre-determined flow rate value.

Other detectable conditions not related to the natural gas source includes the environment outside of the natural gas storage facility, which are also useful in associating with the beginning or end of the peak or non-peak periods of demand. Such detectable conditions include the external temperature and changes to the temperature with time, and the presence or lack of daylight.

Other detectable condition not related to the conditions of the natural gas source but can be associated with the beginning or end of the peak or non-peak periods of demand is the time of day. For example, during a 24-hour operating cycle, the operations associated with the peak period of demand can start at a first time several hours before sunset— in the mid- to late afternoon—and continue until a second time several hours after sunset—the early evening. The operations associated with the non-peak period of demand can start at a third time after midnight—the early morning— and terminate in the early morning at a fourth time after sunrise. The two periods can be of similar or different lengths in time.

Detectable conditions can be related to the operating performance of the natural gas storage facility. For example, detecting that the light natural gas composition is not sufficiently free of propane indicates a breakthrough from the guard bed system. This may indicate that the guard bed system storage capacity is filled or that the guard bed system heavy natural gas adsorbent requires replacement. This detectable condition can be associated with the ending of the period of non-demand and a conclusion of gathering natural gas operations.

Combinations of detectable conditions can associate the beginning or the end of the period of demand or the period of non-demand. For example, a period of demand can begin when the pressure of the natural gas source is at or below the daily average pressure value, the rate of change in the pressure of the natural gas source indicates that source pressure is declining, and sunlight is detected. The number and variety of combinations of detectable conditions useful for indicating the start or end of either a period of demand or non-demand are legion.

An embodiment of the natural gas storage facility includes an automated monitoring and control system that is operable to maintain the facility based upon the detected conditions. The automated monitoring and control system can include pre-established instructions that permit monitoring for detectable conditions and initiate pre-determined action upon detection of one or more detectable conditions. Examples of responses to the detection of a detectable condition include the sounding of an alarm to notify an operator of the change in the natural gas source condition associated with the detected condition and an automated initiation by a pre-programmed computer controller of a sequence of operations in response to the detected condition.

The peak and non-peak periods of demand can occur in adjacent periods to one another such that the periods are proximate and successive in time. An embodiment of the method of using the natural gas storage facility includes using a detectable condition that indicates a conclusion to a first period of peak demand and the beginning of a second, succeeding period of non-demand, or vice versa. The peak and non-peak periods of demand can occur in separate portions of the day where the peak period of demand is not proximate in time to the non-peak period of demand. Periods of what is considered in the art as "steady operations", where natural gas demand and natural gas supply from the natural gas source are approximately the same, can separate the peak and non-peak periods of demand for as little as a few second to as long as several hours.

Multiple peak and non-peak periods of demand can occur within a single 24-hour cycle. Peak and non-peak periods of demand can occur due to acute instances or unexpected events during the day. For example, a process upset or operational condition downstream of the natural gas storage facility can change a peak period of demand to a non-peak period of demand with little notice. A weather event may not only change demand conditions but also natural gas source conditions that disrupts the otherwise expected demand condition for that time of day and year.

Use of the Natural Gas Storage Facility

During the non-peak period of demand, the natural gas source introduces natural gas into the natural gas storage facility. To reduce overall power consumption, differences in pressure between the natural gas source and the natural gas storage facility drives natural gas flow. The pressure difference during the period of non-peak demand drives the introduced natural gas into the natural gas storage facility.

The natural gas storage facility operates during the period of non-peak demand such that the introduced natural gas passes into the guard bed system. The operation of the guard bed system is such that impurities are removed and selective separation of the introduced natural gas such that both the heavy and light natural gas components form. The guard bed system retains the heavy natural gas component during the non-peak period of demand. The light natural gas component passes to the adsorption bed system, where it is retained by the light natural gas adsorbent during the non-peak period of demand.

During the peak period of demand, the natural gas storage facility introduces the released natural gas components to the natural gas source. An embodiment of the method of use includes introducing the released heavy natural gas component to the natural gas source. An embodiment of the method of use includes introducing the released light natural gas component to the natural gas source. An embodiment of the method of use includes introducing the released natural gas product, which is a mixture of the released light natural gas component and the released heavy natural gas component, to the natural gas source. An embodiment of the method of use includes where the released natural gas product has a similar thermal value to the thermal value of the introduced natural gas.

The natural gas storage facility utilizes changes in temperature of the guard bed system and the adsorption bed system to facilitate adsorption, retention and desorption of the natural gas components. Changes in temperature of the external environment as well as the temperature of the natural gas introduced from the natural gas source provide assistance in changing the adsorption capacity of the light natural gas adsorbent and, if present, the heavy natural gas adsorbent. In an embodiment of the natural gas storage facility that includes a temperature control system, an embodiment of the method of use of the natural gas storage facility includes operating the facility such that the temperature control system removes heat from the guard bed system during the period of non-peak demand. The removal of heat facilitates the separation and retention of the heavy natural gas component in the guard bed system. An embodiment of the method of use includes operating the facility such that the temperature control system removes heat from the heavy natural gas adsorbent during the period of non-peak demand. An embodiment of the method of use includes operating the facility such that the temperature control system removes heat from the light natural gas adsorbent during the period of non-peak demand. Cooling the adsorbing material in either the guard bed system or the adsorption bed system, or both, removes the heat of adsorption from the adsorbent material present in the systems and facilitates the retention process.

Adding heat has an opposing effect and is useful during the peak period of demand to facilitate desorption. In an embodiment of the natural gas storage facility that includes a temperature control system, an embodiment of the method of use of the natural gas storage facility includes operating the temperature control system such that heat is introduced into the guard bed system during the period of peak demand. An embodiment of the method of use includes operating the temperature control system such that heat is introduced into the heavy natural gas adsorbent during the period of peak demand. An embodiment of the method of use includes operating the temperature control system such that heat is introduced into the light natural gas adsorbent during the period of peak demand. Providing heat during the peak period of demand facilitates production of the desorbed natural gas components and prepares the bed systems and the adsorption materials for the next cycle.

The energy from the released light natural gas component, especially if heat has been introduced, can be used to release the heavy natural gas component. An embodiment of the method of use of the natural gas storage facility includes operating the facility such that the released light natural gas is introduced into the guard bed system such that the heavy natural gas component is released from the guard bed system by the introduction of the light natural gas component. The combination of the released light natural gas and the released heavy natural gas in the guard bed system forms the released natural gas product. Not only does this conserve energy by not requiring the application of heat to the guard bed system but also permits the formation of the released natural gas product before introduction into the natural gas source.

The natural gas storage facility also utilizes changes in pressure between the natural gas source and the natural gas storage facility to facilitate introduction of natural gas to the natural gas storage facility, adsorption of the natural gas components, retention, desorption and introduction of the natural gas components to the natural gas source. Changes in pressure of the natural gas source as well as the use of an optional storage facility compressor provides assistance in changing the adsorption capacity of the light natural gas adsorbent and, if present, the heavy natural gas adsorbent. The natural gas storage facility does not require compression equipment to introduce natural gas into the guard bed or the adsorption bed systems or to introduce the natural gas components from the guard bed or the adsorption bed systems into the natural gas source. At the beginning of a period of peak demand, the pressure within the natural gas storage facility is greater than the pressure of the natural gas source. At the beginning of the period of non-peak demand, the pressure of the natural gas source is greater than the pressure within the natural gas storage facility.

In an embodiment of the natural gas storage facility that includes a storage facility compressor, an embodiment of the method of use of the natural gas storage facility includes operating the storage facility compressor during the introduction of the natural gas from the natural gas source into the natural gas storage facility. Operating the storage facility compressor during this period can form a pressure differential between the natural gas storage facility and the natural gas source that draws natural gas into the natural gas storage facility. Continuing the draw in natural gas after the natural gas source and the natural gas storage facility have equalized in pressure facilitates the maximization of storage capacity. In an embodiment of the natural gas storage facility that includes a storage facility compressor, an embodiment of the method of use includes operating the storage facility compressor such that it mixes the released light and heavy natural gas components together to form the released natural gas product before the mixture is introduced into the natural gas source.

An embodiment of the method of use includes operating the facility such that the storage facility compressor induces a less than atmospheric pressure in the guard bed system. An embodiment of the method of use includes operating the storage facility compressor such that a less than atmospheric pressure condition forms in the adsorption bed system. Reducing the pressure to below atmospheric pressure in the guard and adsorption bed systems facilitates the release of the heavy and light natural gas components from the bed systems. Isolating the guard bed or adsorption bed systems while under partial vacuum during the peak period of demand can assist in forming the motivating pressure differential between the natural gas storage facility and the natural gas source during the non-peak period of demand.

Detectable conditions indicating the beginning and end of the periods of demand and non-demand can initiate and terminate operation of the natural gas storage facility. An embodiment of the method of use of the natural gas storage facility includes detecting a condition that indicates the start of the peak period of demand. An embodiment of the method of use includes detecting a condition that indicates the end of the peak period of demand. An embodiment of the method of use includes detecting a condition that indicates the start of the non-peak period of demand. An embodiment of the method of use includes detecting a condition that indicates the end of the non-peak period of demand. The detectable condition can be associated with the natural gas source, for example, source pressure, the natural gas storage facility, the time of day or with the external environment.

What is claimed is:

1. A natural gas storage facility for reducing effects of diurnal demand on a natural gas source, the natural gas storage facility comprising:
   a guard bed system that has a heavy natural gas component storage capacity, that contains a heavy natural gas adsorbent, and that is operable to remove impurities from introduced natural gas, to selectively separate by adsorption the introduced natural gas into a heavy natural gas component and a light natural gas component, to retain the heavy natural gas component and to release the heavy natural gas component, via control of temperature and pressure of the guard bed system;
   an adsorption bed system that fluidly couples to the guard bed system, that has a light natural gas component storage capacity, that contains a light natural gas adsorbent that is a microporous material, and that is operable to retain the light natural gas component by adsorption using the light natural gas adsorbent and to release the light natural gas component from the light natural gas adsorbent, via control of temperature and pressure of the adsorption bed system;
   a temperature control system that is separately coupled to both the guard bed system and the adsorption bed system and is operable to regulate temperature of the guard bed system and the adsorption bed system separately via heat transfer using a heat transfer fluid; and
   optionally, a compressor system that is separately fluidly coupled to both the guard bed system and the adsorption bed system and is operable to regulate pressure of the guard bed system and the adsorption bed system separately, and the compressor system operable to pressurize the light natural gas component and the heavy natural gas component for introduction into the natural gas source;
   where the natural gas source couples to the natural gas storage facility such that the introduced natural gas enters the guard bed system, where a pressure difference between the natural gas source and the natural gas storage facility during non-peak demand introduces natural gas from the natural gas source into the natural gas storage facility without compression, and where the guard bed system and adsorption bed system are operable to return the heavy natural gas component and the light natural gas component, respectively, back to the natural gas source without compression when there is a suitable difference in pressure between the guard bed system and the natural gas source and between the adsorption bed system and the natural gas source, the pressure differences between the natural gas source and the natural gas storage facility driving natural gas flow to reduce power consumption.

2. The natural gas storage facility of claim 1, where the heavy natural gas adsorbent material is a microporous material.

3. The natural gas storage facility of claim 1, where the microporous material has a BET Specific Surface Area value of at least about 800 meters squared per gram ($m^2/g$) and a Micropore Volume value of at least about 0.300 centimeters cubed per gram ($cm^3/g$) of microporous material as determined using nitrogen porosimetry at 77° K.

4. The natural gas storage facility of claim 1, where the microporous material is an activated carbon with slit-shaped micropores, has a bulk density is in a range of from about 0.20 to about 0.75 grams per cubic centimeter ($g/cm^3$), and has a BJH Average Pore Width in a range of from about 10 to about 30 Angstroms (Å) as determined using nitrogen porosimetry at 77° K.

5. The natural gas storage facility of claim 1, where the microporous material has an adsorbed amount ratio greater than about 60 at 40 bars of system pressure and an adsorbed amount ratio greater than about 65 at 50 bars of system pressure at 56° C. using methane.

6. The natural gas storage facility of claim 1, where the microporous material has an adsorbed amount ratio greater than about 100 at a pressure in a range of from about 35 bars to 55 bars at 21° C. using methane.

7. The natural gas storage facility of claim 1, where the microporous material has a stored amount ratio of greater than about 115 at 50 bars of system pressure, greater than about 110 at 45 bars of system pressure, and greater than about 100 at 40 bars system pressure, all using methane at 21° C.

8. The natural gas storage facility of claim 1, where the microporous material has a stored amount ratio greater than about 100 at a pressure in a range of from 35 bars to 55 bars at 21° C. using methane.

9. The natural gas storage facility of claim 1, where the introduced natural gas does not form either hydrocarbon liquids or non-hydrocarbon liquids at operating conditions of the natural gas storage facility, and where condensation and vaporization are avoided in the natural gas storage facility.

10. The natural gas storage facility of claim 1, where natural gas is introduced into the natural gas storage facility during a non-peak period of demand.

11. The natural gas storage facility of claim 1, where the guard bed system releases the heavy natural gas component during a peak period of demand.

12. The natural gas storage facility of claim 1, where the adsorption bed system releases the light natural gas component from the light natural gas adsorbent during a peak period of demand.

13. The natural gas storage facility of claim 1, where the heavy natural gas component and the light natural gas component are operable to be released and mixed to form a released natural gas product.

14. The natural gas storage facility of claim 1, where the guard bed system is operable to remove propane from the introduced natural gas, such that the light natural gas component is substantially free of propane.

15. The natural gas storage facility of claim 1, where the guard bed system is operable to remove ethane from the introduced natural gas, such that the light natural gas component is substantially free of ethane.

16. The natural gas storage facility of claim 13, where the released natural gas product has a similar temperature to a temperature of the introduced natural gas.

17. The natural gas storage facility of claim 1, wherein during a non-peak period of demand, heat is removed from the guard bed system.

18. The natural gas storage facility of claim 1, operable such that during a peak period of demand, heat is introduced into the guard bed system.

19. The natural gas storage facility of claim 1, operable such that during a non-peak period of demand, heat is removed from the light natural gas adsorbent.

20. The natural gas storage facility of claim 1, operable such that during a peak period of demand, heat is introduced into the light natural gas adsorbent.

21. The natural gas storage facility of claim 1, further comprising the compressor system, the compressor system comprising a storage facility compressor.

22. The natural gas storage facility of claim 21, where the storage facility compressor is operable such that during operation in a period of peak demand, a less than atmospheric condition forms in the guard bed system.

23. The natural gas storage facility of claim 21, where the storage facility compressor is operable such that during operation in a period of peak demand, a less than atmospheric pressure condition forms in the adsorption bed system.

* * * * *